US007249043B1

(12) United States Patent  
Trout, II et al.

(10) Patent No.: US 7,249,043 B1
(45) Date of Patent: Jul. 24, 2007

(54) COMPUTER PROGRAM AND METHOD FOR REDUCING HVAC DEMAND FOR ENERGY

(75) Inventors: Benjamin H. Trout, II, Fulton, MO (US); James O. Johnson, Columbia, MO (US); Christopher C. Adam, Columbia, MO (US)

(73) Assignee: E.P.M., Inc., Fulton, MO (US)

( * ) Notice: Subject to any disclaimer, the term of this patent is extended or adjusted under 35 U.S.C. 154(b) by 0 days.

(21) Appl. No.: 09/522,751

(22) Filed: Mar. 10, 2000

(51) Int. Cl.
*G06Q 99/00* (2006.01)
(52) U.S. Cl. .................. 705/8; 705/8; 705/7; 705/1
(58) Field of Classification Search .............. 705/8, 705/7, 26, 27, 1, 18
See application file for complete search history.

(56) References Cited

U.S. PATENT DOCUMENTS

| 4,023,043 | A | | 5/1977 | Stevenson ................. 307/38 |
| 4,549,274 | A | | 10/1985 | Lerner et al. .............. 700/295 |
| 4,551,812 | A | * | 11/1985 | Gurr et al. ................. 700/295 |
| 4,677,566 | A | | 6/1987 | Whittaker et al. .......... 700/295 |
| 4,847,782 | A | | 7/1989 | Brown, Jr. et al. ......... 700/296 |
| 4,916,328 | A | | 4/1990 | Culp, III ................... 307/39 |
| 5,404,136 | A | | 4/1995 | Marsden ............... 340/870.03 |
| 5,598,349 | A | | 1/1997 | Elliason et al. ............ 700/295 |
| 5,761,083 | A | | 6/1998 | Brown, Jr. et al. ......... 700/296 |
| 5,970,465 | A | * | 10/1999 | Dietrich et al. ............. 705/7 |
| 6,088,688 | A | * | 7/2000 | Crooks et al. ............. 705/412 |
| 6,112,181 | A | * | 8/2000 | Shear et al. ................. 705/1 |
| 6,178,362 | B1 | * | 1/2001 | Woolard et al. ............ 700/295 |
| 6,327,541 | B1 | * | 12/2001 | Pitchford et al. ............ 702/62 |
| 6,618,709 | B1 | * | 9/2003 | Sneeringer ................. 705/412 |
| 6,636,893 | B1 | * | 10/2003 | Fong ........................ 709/223 |
| 6,785,592 | B1 | * | 8/2004 | Smith et al. ............... 700/291 |
| 2003/0216971 | A1 | * | 11/2003 | Sick et al. .................. 705/26 |

FOREIGN PATENT DOCUMENTS

GB 2334863 1/1999

OTHER PUBLICATIONS

Misner et al, "Preparing for a deregulated electric marketplace", Nov.-Dec. 1998, Industrial Management, 40, 6, 22(5).*

* cited by examiner

*Primary Examiner*—Akiba K. Robinson-Boyce
(74) *Attorney, Agent, or Firm*—Hovey Williams LLP

(57) ABSTRACT

A method of providing a limited resource to a plurality of users that aggregates the plurality of users into a purchasing block, arranges for the availability of the resource and regulates the use of the resource by each of the users based on each of the user's need for the resource so that a particular user having a greater need for the resource receives a greater provision of the resource while controlling usage of the resource to maintain aggregated usage below a predetermined level. The method is implemented through the use of an aggregation controller and a plurality of consumer resource controllers located at consumers' facilities. Communication between the aggregation controller and the consumer resource controllers is achieved through the use of a communication network, such as the Internet.

31 Claims, 6 Drawing Sheets

COMPUTER PROGRAM AND METHOD FOR REDUCING HVAC DEMAND FOR ENERGY

APPENDIX

An appendix entitled "WAA Data Transfer Format" and containing data transfer formats used in the present invention is attached.

BACKGROUND OF THE INVENTION

1. Field of the Invention

The present invention relates to energy conservation and allocation methods. More particularly, the invention relates to computer program and method for distributing a limited resource to a plurality of users so as to aggregate the users and organize the distribution of the resource to meet the limited availability of the resource according to need.

2. Description of the Prior Art

The impending deregulation of various energy resources such as electricity and natural gas has created an opportunity to combine consumers' resource requirements in order to approach the marketplace and acquire the best price. Consumers experience not only a per time unit requirement of a resource (such as a kilowatt-hour requirement for electricity) but also a peak availability, or demand, for the resource (such as a kilowatt demand).

Suppliers of the limited resource must be prepared to supply these two facets of use by maintaining appropriate capacity. If no control is placed over the use of the limited resource, the use of the resource will typically peak at certain times of the year, for example in the summer for electricity. Electric utility companies must design generation capacity to meet the highest demand on the highest usage day of the year. The alternative is to subject customers to possible brown outs or black outs.

Distribution systems for limited resources are traditionally limited to providing the limited resource to consumers physically attached to the distribution company's facilities. Thus, consumers must purchase the limited resource only from the attached distribution company and cannot aggregate with other consumers attached to other distribution systems and bargain for better rates.

Prior art energy control systems have been developed that allow utility companies to control specific appliances at consumers' homes or businesses by turning the appliance on or off based on the needs of the utility company to reduce the demand for the resource. These prior art systems do not consider the resource needs of consumers and thus may result in an appliance being turned off at a very inopportune time.

Other prior art methods use power consumption reduction based on a "comfort fairness" procedure. The "comfort fairness" method sheds loads with the lowest priority first. The "comfort fairness" method focuses on the systems in one building but does not take into account need over an aggregated system of users.

Accordingly, a need exists for an improved method of providing a limited resource to a plurality of users that overcomes the limitations of the prior art.

OBJECTS AND SUMMARY OF THE INVENTION

The present invention solves the above-described problems and provides a distinct advance in the art of limited resource control methods. More particularly, the present invention provides a method of providing a limited resource to a plurality of users that aggregates the plurality of users into a purchasing block, arranges for the availability of the resource and regulates the real-time use of an amount of the resource by each of the users based on each of the user's need for the resource relative to other users' needs so that a particular user having a greater need for the resource receives a greater provision of the resource while controlling usage of the resource to maintain aggregated usage below a predetermined level.

The method of the present invention provides numerous advantages. For example, the method reduces consumers' peak demands, thereby requiring the purchase of less generation capacity from the generation facilities. Also, consumers are not limited to purchasing resources from just the owner of the distribution system to which they are connected. If a resource is widely distributed, such as the distribution of electricity via the U.S. electric power grid, consumers thousands of miles apart can combine their requirements and purchase electricity as an aggregation of consumers, thereby using their strength in size to get the best price available. Moreover, because the method provides resources based on each consumer's need, consumers are less likely to be adversely affected by demand reduction efforts.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
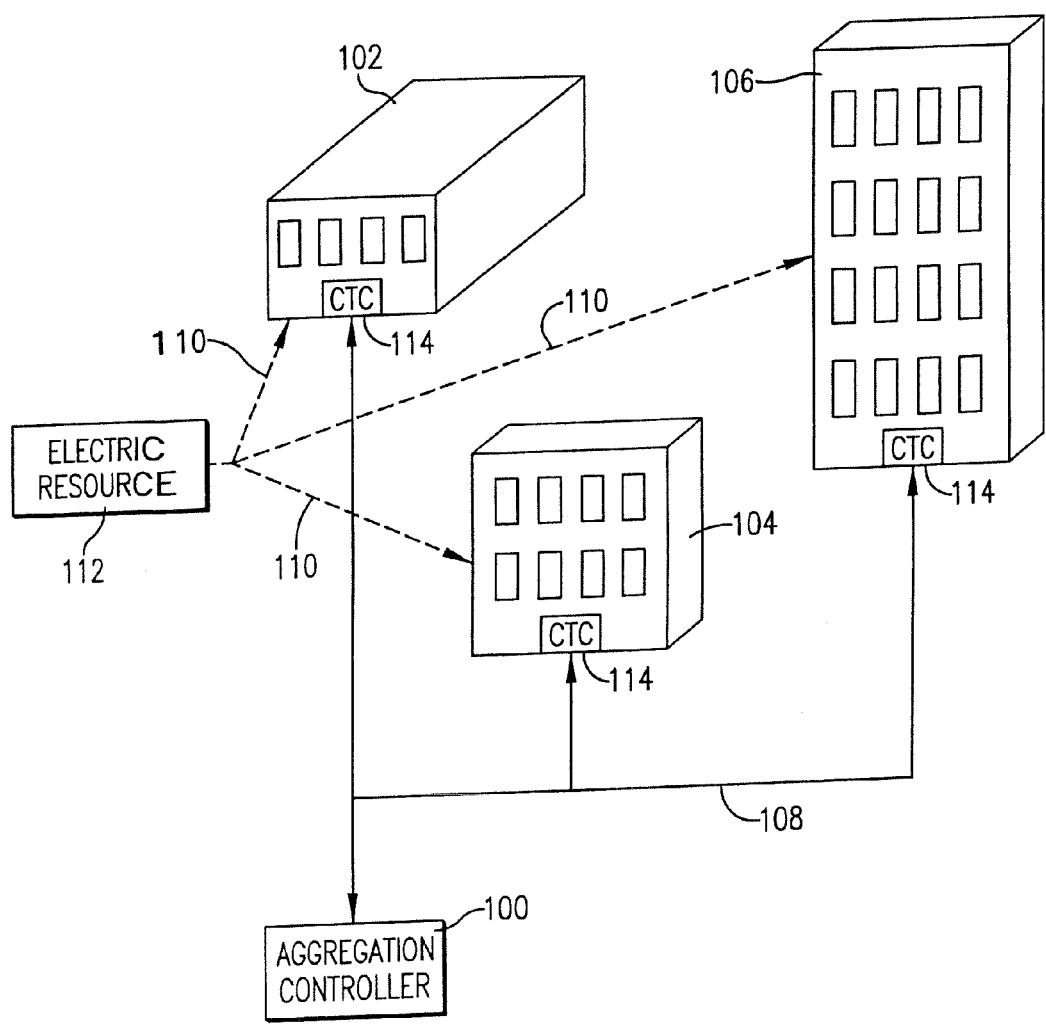
FIG. 1 is a schematic diagram illustrating a wide area aggregation demand reduction system in accordance with a preferred embodiment of the present invention.

FIG. 1 illustrates a wide area aggregation demand reduction system operable to combine consumers' resource needs in accordance with a preferred embodiment of the present invention. The system broadly includes an aggregation controller (AC) 100 for supplying instructions to a plurality of resource consumers 102, 104, 106 via a communications network 108 such as Internet or a Wide Area Network (WAN) or a combination of the WAN and the Internet, depending on which of the networks is the most efficient for the consumers to use. Any bi-directional communication network that covers a distribution area and has a required bandwidth may be used. Each of the consumers may be of a variety of types, such as a movie theater, an office building, or a school. A distribution link 110 connects each consumer to an energy source such as an electric resource 112. A consumer resource controller (CRC) is located at each consumer's facility. The consumer resource controller may be a controller for any limited resource. When the resource controlled is electricity for heating or cooling purposes the consumer resource controller is a computerized temperature controller™ (CTC)™ 114. The computerized temperature controller 114 is located at each of the consumers 102, 104, 106. Although electricity is discussed as the limited resource distributed, electricity is not the only resource that meets the distribution requirement. Other resources include: natural gas, propane, chilled water, steam, oil, coal, hot water, and other products delivered by a defined distribution system.

The aggregation controller 100 directs and controls communication of aggregation data to and from the computerized temperature controllers 114 via connection with the communication network 108. The aggregation controller 100 hardware may be of many different types, the preferred embodiment being a web server class personal computer Intel clone such as a Pentium II, 400 MHz CPU with 128 MBytes of random access memory and an 8 Gbyte hard drive, with the appropriate network card to match the communication network 108, such as an NE2000 10baseT compatible network card for an Ethernet network. Preferably the computer uses a Linux operating system.

The graphical user interface of the computerized temperature controllers 114 provide a user friendly interface for building resource control, record computerized temperature system histories and provide master control to building controls. The computerized temperature controller graphical user interface 114 hardware may be chosen from many different options, the preferred embodiment being a web server class personal computer Intel clone such as a Pentium II, 400 MHz CPU with 128 MBytes of random access memory and an 8 Gbyte hard drive, with the appropriate network card to match the communication network 108, such as an NE2000 10baseT compatible network card for an Ethernet network. The computer preferably uses a Linux operating system.

Figure 2:
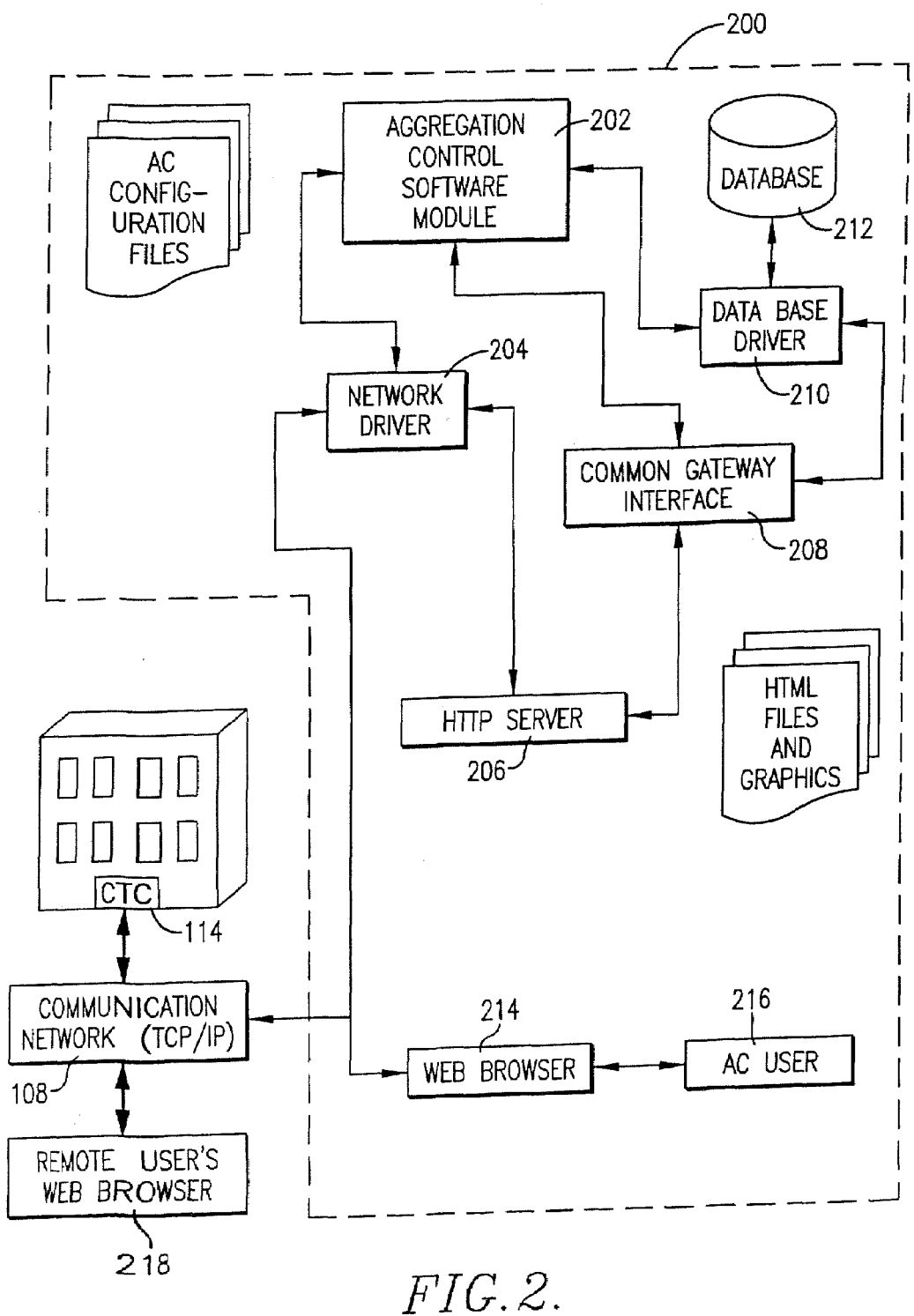
FIG. 2 is a schematic diagram illustrating certain software modules and components contained in an aggregation controller.

FIG. 2 depicts software modules within the aggregation controller 200 which preferably consists of an aggregation control software module 202, a network driver 204, an HTTP server 206, a common gateway interface (CGI) 208, a database driver 210, a database 212, and a web browser 214 to interface with an aggregation controller's user 216. The software modules within the aggregation controller 200 couple with the communication network 108. The computerized temperature controller 114 connects to the communication network 108 via use of hardware and software modules within the computerized temperature controller 300. Remote users also find access via a remote user's web browser 218.

The aggregation control software module 202 is the main computation module among the software modules within the aggregation controller 200, performing required calculations and directing data flow through the aggregation controller 100. The aggregation control software module 202 is coupled with the network driver 204, the database driver 210 and the common gateway interface 208. The aggregation control software module 202 is written in C for the Linux operation system.

The network driver 204 conforms data that is passed along the TCP/IP network protocol. The network driver 204 is coupled with the aggregation control software module 202, the HTTP server 206, the web browser 214, and the communication network 108. The network driver 204 preferably follows the TCP/IP protocol or IPX protocol. The network driver 204 is part of the Linux operating system.

The HTTP server 206 handles requests from the web browser 214 and the remote user's web browser 218 and processes Common Gateway Interface (CGI) scripts to generate Hypertext Markup Language (HTML) that is sent to the web browser 214 and the remote user's web browser 218. The HTTP server 206 is coupled with the network driver 204 and the common gateway interface 208. The HTTP server 206 may be one of several types of software modules, the preferred embodiment being an Apache server, version 1.3.6.

The common gateway interface 208 generates HTML pages through the use of CGI scripts and is coupled with the aggregation control software module 202, the database driver 210 and the HTTP server 206. The preferred method of creating the common gateway interface 208 scripts is to write the scripts in the Practical Extraction and Report Language (PERL) software language.

The database driver 210 provides an interface to the database 212 and is coupled with the common gateway interface 208, the aggregation control software module 202 and the database 212. The preferred database driver 210 is implemented with use of an mSQL database system from Hughes Technologies.

The web browser 214 performs as a user interface to the aggregation controller 100 through use of a monitor, keyboard and mouse (not shown) attached to the aggregation controller 100. The web browser 214 provides a graphical user interface (GUI) for the aggregation controller's user 216. The web browser 214 is coupled with the network driver 204, the communication network 108 and the aggregation controller's user 216. The preferred web browser 214 is Netscape Navigator, Version 4.7.

The communication network 108 acts as a communication channel to transmit communication between the software modules within the aggregation controller 200, the software modules within the computerized temperature controller 300 and the remote user's web browser 218. The communication network 108 is preferably the Internet or Wide Area Network (WAN) with TCP/IP protocol.

The remote user's web browser 218 allows a remote user to manage the system from a remote area. The remote user's web browser 218 is coupled to the communication network 108. Although many types of web browsers can be used, a preferred web browser is Netscape Navigator, Version 4.7.

Figure 3:
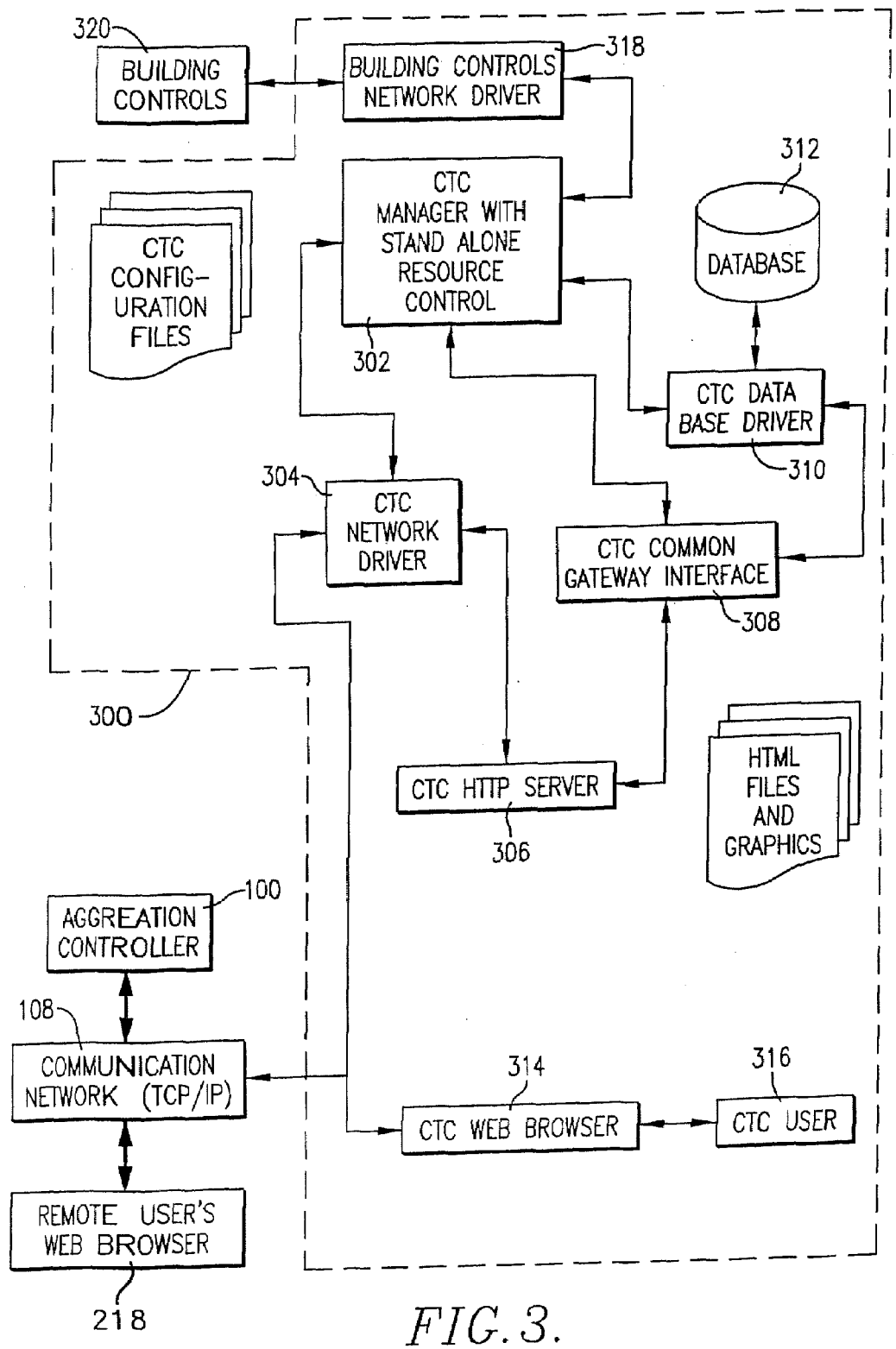
FIG. 3 is a schematic diagram illustrating certain software modules and components contained in a computerized temperature controller.

FIG. 3 depicts the software modules within the computerized temperature controller graphical user interface 300 which preferably include a computerized temperature controller (CTC) manager with stand alone resource control 302, a CTC network driver 304, a CTC HTTP server 306, a CTC common gateway interface (CGI) 308, a CTC database driver 310, a CTC database 312, a CTC web browser 314 to interface with a computerized temperature controller user 316, and a building controls network driver 318 to interface with the building controls 320. The communications network 108, such as a TCP/IP connection to the Internet, provides for communication between the software modules within the computerized temperature controller 300 and the software modules within the aggregation controller 200. The remote users access the system via the remote user's web browser 218.

The CTC manager with stand alone resource control 302 is the main software module for the computerized temperature controller 114. The CTC manager with stand alone resource control 302 module handles automated processes such as stand alone resource control, recording of historical data, such as demand usage, and requests for information from the CTC common gateway interface 308. The CTC manager with stand alone resource control 302 is coupled with the CTC network driver 304, the CTC common gateway interface 308, the CTC database driver 310 and the building controls network driver 318. The CTC manager with stand alone resource control 302 is written in C for the Linux operating system.

The CTC network driver 304 provides a communication interface between the software modules and is coupled with the CTC manager with stand alone resource control 302, the CTC HTTP server 306, the CTC web browser 314, and the communication network 108. The CTC network driver 304 preferably follows the TCP/IP protocol or IPX protocol. The CTC network driver 304 is part of the Linux operating system.

The CTC HTTP server 306 handles requests from the CTC web browser 314 and the remote user's web browser 218 and processes Common Gateway Interface (CGI) scripts to generate Hypertext Markup Language (HTML) that is sent to the CTC web browser 314 and the remote user's web browser 218. The CTC HTTP server 306 is coupled with the CTC network driver 304 and the CTC common gateway interface 308. The CTC HTTP server 306 may be one of several types of software modules, the preferred embodiment being an Apache server, version 1.3.6.

The CTC common gateway interface 308 provides HTML coded pages to the CTC HTTP Server 306 querying information from the common gateway interface 308 regarding information such as systems histories and system settings. The preferred method of creating the CTC common gateway interface 308 scripts is to write the scripts in the Practical Extraction and Report Language (PERL) software language.

The CTC database driver 310 provides an interface to the CTC database 312. The CTC database driver 310 is coupled with the CTC common gateway interface 308, the CTC manager with stand alone resource control 302 and the CTC database 312. Preferably the CTC database driver 310 is contained in an mSQL Version 2.0.11 database system.

The CTC database 312 stores information including CTC systems histories and settings. The CTC database 312 is coupled with the CTC database driver 310 and preferably is accessed in an mSQL request for the database. The mSQL database uses mSQL commands to perform operations on the CTC database 312.

The CTC web browser 314 acts as the graphical user interface and is coupled with the CTC network driver 304, the communication network 108 and the computerized temperature controller user 316. The CTC web browser 314 may be one of many types of browsers. In this preferred embodiment, the CTC web browser 314 is Netscape Navigator Version 4.7.

The building controls network driver 318 performs communication functions between the CTC manager with stand alone resource control 302 and the building controls 320. The building controls network driver 318 is coupled with the CTC manager with stand alone resource control 302 and the building controls 320. The building controls network driver 318 is preferably a software module containing a communication protocol implemented through C for the Linux operation system and based on an IEEE-485 standard two-way communication protocol. Hardware to complete the coupling between the building controls network driver 318 and the building controls 320 can be internal or external to the computerized temperature controller graphical user interface computer.

Operation

The method of the present invention provides a limited resource to the consumers 102, 104, 106 by: (1) aggregating the plurality of users into a purchasing block, (2) arranging for the availability of the resource, and (3) regulating the use of an amount of the resource by each of the users based on each of the user's need for the resource so that a particular user having greater need for the resource receives a greater provision of the resource while controlling usage of the resource to maintain aggregated usage below a predetermined level. Each of these steps is described in detail below.

An aggregator is an entity that controls the aggregation. The aggregator can be any organization, including an existing utility or an independent organization or individual.

The aggregator preferably forms an aggregation group of consumers with different peak electricity usage times. For example, an office building in St. Louis, Mo. will most likely experience an electrical peak in the summer months in the mid-afternoon of a weekday, whereas a bowling alley in San Jose, Calif., open only in the evenings might experience its peak later in the evening in the summer months.

If the aggregator is not a generator of electricity, the aggregator contracts with the providers of electricity for the best possible price. The aggregator knows the historical load characteristics of the aggregated consumers and contracts for the required amount of electricity. The consumers are aware of the restrictions of load usage. The aggregator has a contracted privilege of controlling the consumer's demand for the electricity by sending out restriction signals to the consumer that the consumer's computerized temperature controller must follow if the consumer is to participate in the aggregation group without penalty.

The communication network carries control signals from the aggregation controller to the computerized temperature controller and response signals and load information from the computerized temperature controller to the aggregation controller.

Figure 4:
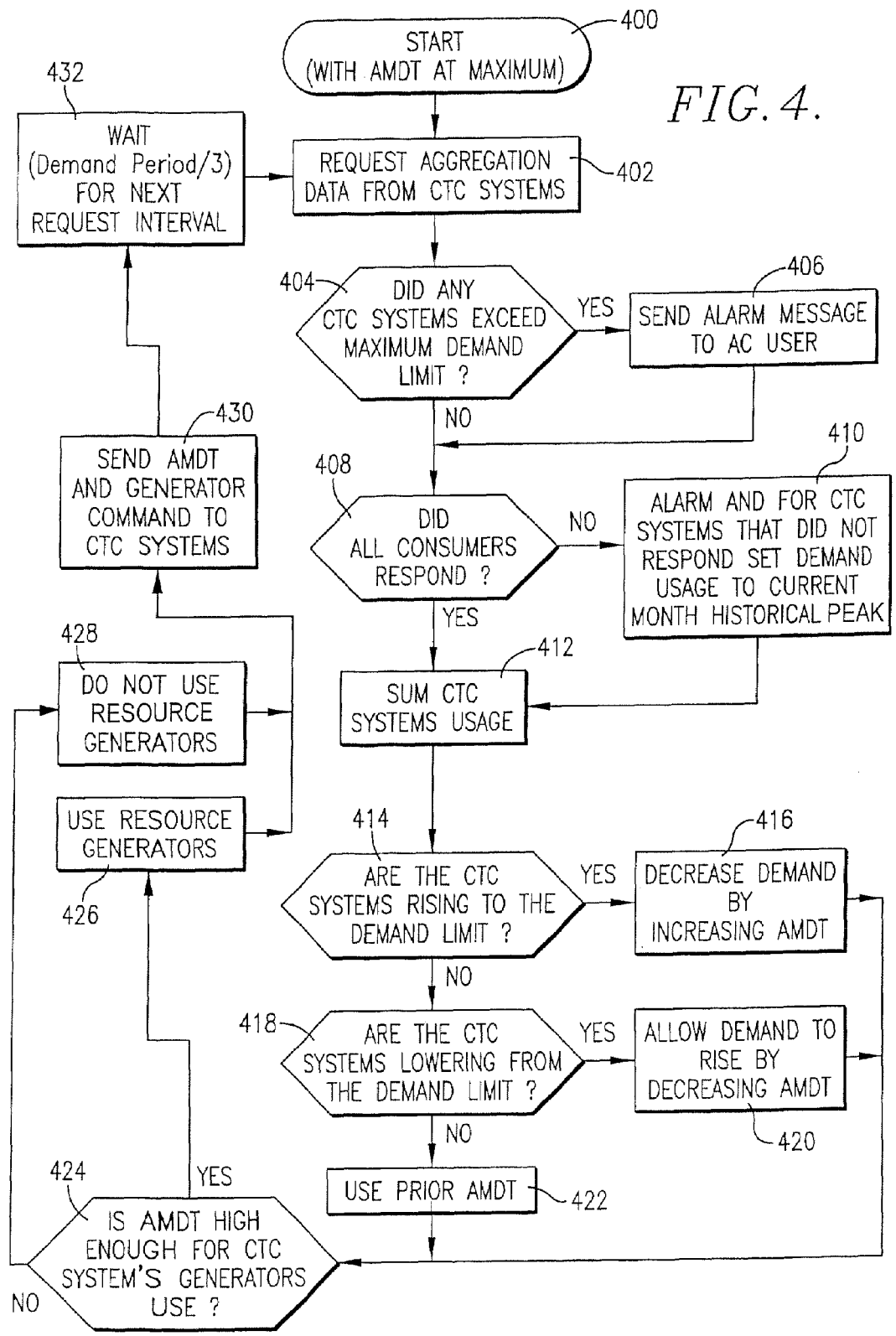
FIG. 4 is a flow diagram generally depicting the steps performed by the aggregation controller.

FIG. 4 depicts the aggregation controller's control flowchart. Step 400 depicts the start of the control flowchart with the aggregation maximum delta temperature (AMDT) set at a maximum. The aggregation maximum delta temperature is the maximum difference in temperature allowed. When the aggregation maximum delta temperature is reached, the limiting of demand use is halted and the consumer's equipment is allowed to run.

Step 402 requests aggregation data from the computerized temperature controller consisting of electricity usage information and other information including temperature information that is useful when evaluating and controlling HVAC systems. The aggregation controller monitors the electricity use at each consumer through the computerized temperature controller and can manipulate data received. The manipulation of data includes a summation of demand that the consumers are collectively and simultaneously experiencing. The aggregation controller sends commands to the computerized temperature controllers at each consumer that allow the computerized temperature controllers to control the electricity usage.

Step 404 checks resource data (demand information) from each consumer. If any of the computerized temperature controllers indicate that the systems exceed their maximum demand limit, step 406 triggers an alarm to alert an operator of the aggregation controller.

Step 408 checks for any computerized temperature controller that did not respond to the aggregation controller's request for the resource data. If one or more of the computerized temperature controllers did not respond, Step 410 triggers an alarm to the operator to inform the operator of a noncompliance. For the non-responsive computerized temperature controllers, the aggregation controller will use historic peak data to provide the resource information.

Step 412 sums the demand data from the computerized temperature controllers. Step 414 compares the summation result with an allowed maximum demand limit for the total aggregation of consumers. The aggregation controller calculates the rate of approach to the demand limit. If the rate of increase meets a specified amount, then step 416 works to decrease the demand in order not to achieve a total summed demand at an undesirable level. Increasing the aggregation maximum delta temperature achieves the decrease in demand in the context of an HVAC application. Therefore, if the aggregation controller increases the aggregation maximum delta temperature, the HVAC equipment is limited in a methodical procedure so that the result is a reduction in the demand for electricity.

If the summation result is not rising to a demand limit, step 418 checks to see if the summation result is lowering from the demand limit. If it is, step 420 decreases the aggregation maximum delta temperature, allowing the total aggregated demand to rise.

If the summation result is not rising to the demand limit and it is not lowering from the demand limit, step 422 uses the aggregation maximum delta temperature used in the last loop of calculation.

Some facilities are equipped with limited resource generators. Step 424 checks to see if the aggregation maximum delta temperature is high enough to justify a request for one or more of the consumers' generators to start. If the aggregation maximum delta temperature is high enough, step 426 sends a command to the appropriate computerized temperature controller(s) to start generating electricity to lower the overall demand of electricity by the consumer and therefore the aggregation group.

If the aggregation maximum delta temperature is not high enough to justify starting one or more of the consumers' generators, step 428 passes control to step 430 to send the aggregation maximum delta temperature to the computerized temperature controllers. Step 432 waits for a period of time no greater than one-third of a time period over which demand is measured before requesting a next sample of the demand data. At the end of the period of time, step 402 repeats the algorithm.

The procedure in which the HVAC equipment's operation is limited is related to the concept that the further the distance between the setpoint and the actual temperature, the more uncomfortable a room or zone will be. Therefore, zones with temperatures farther from their setpoints run their equipment normally to try to bring their temperature closer to a comfortable temperature. Zones with temperatures closest to their setpoints have their equipment operating times reduced as the zones may not be uncomfortable.

The computerized temperature controller responds to the aggregation controller by sending the consumer's demand usage information. The computerized temperature controllers record demand usage data in a moving average manner. As the computerized temperature controller includes a new sample in a calculation, the computerized temperature controller discards an old sample to facilitate a first-in, first out method of producing the moving average. (The computerized temperature controller purposefully calculates the sample period over a time period of one-third or less than the time period over which the provider of the electricity measures the demand usage. The chosen size of the sample period allows for the computerized temperature controller to send instructions to the consumer's equipment in time for the computerized temperature controller to shut down the equipment and a new aggregated demand peak avoided). If the aggregation controller has sent the aggregation maximum delta temperature and generator command information, the computerized temperature controller responds by recording the aggregation maximum delta temperature and the generator command and clearing the communication timer. Then the computerized temperature controller will limit the operation of the equipment according to the aggregation maximum delta temperature, the setpoints and the measured parameter, such as temperature.

Figure 5:
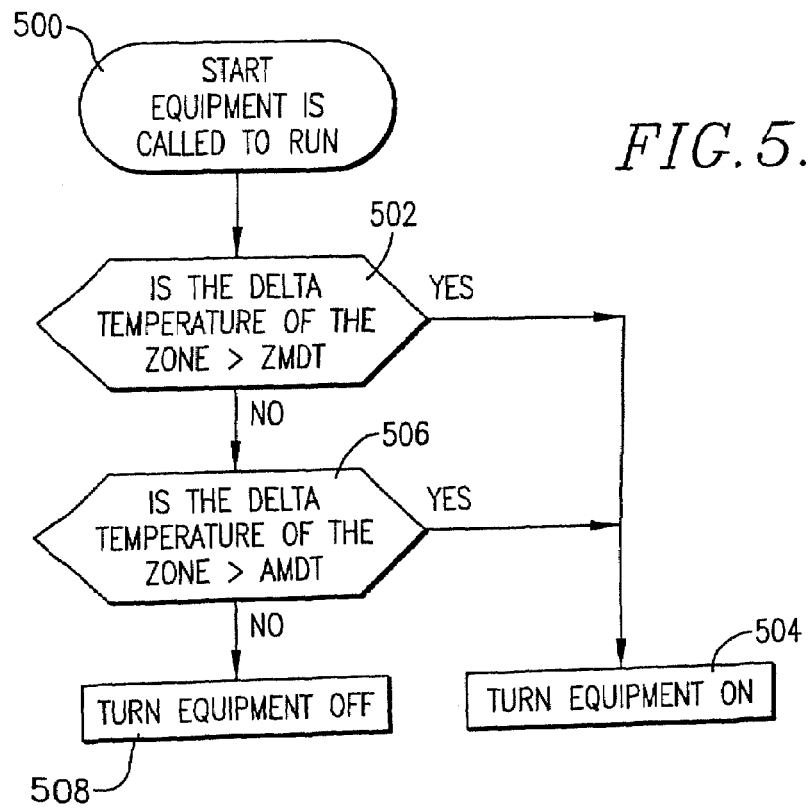
FIG. 5 is a flow diagram generally depicting the steps performed by the computerized temperature controller while communicating with the aggregation controller.

FIG. 5 depicts response by the computerized temperature controller to the aggregation maximum delta temperature sent by the aggregation controller. A consumer's facility consists of zones. Each zone corresponds to a section of the facility. The user assigns each zone a never exceed zone maximum delta temperature (ZMDT). The zone maximum delta temperature is a maximum difference in temperature allowed. Referring to FIG. 5, step 500 denotes the initialization of the response algorithm. Step 502 checks if the difference between the actual temperature and the setpoint (delta temperature) is greater than the zone maximum delta temperature. If it is, step 504 allows the equipment to run. If the delta temperature is less than the zone maximum delta temperature, but greater than the aggregation maximum delta temperature received from the aggregation controller, step 506 also allows the equipment to run. If the delta temperature is less than the zone maximum delta temperature and less than the aggregation maximum delta temperature, then step 508 shuts down the equipment in a predetermined manner. The procedure allows for control within the zone level of the system, as the user who wishes to be comfortable has only to set their zone maximum delta temperature at a low setting.

The computerized temperature controller's control of the consumer's equipment limits the instantaneous demand for the electricity. As the demand for electricity is reduced, the aggregation controller's polling of the computerized temperature controllers reflects the reduction. The aggregation controller compares the reduction in the aggregated total to the targeted demand for electricity based on the relationship of the modified (usually summed) demand with the targeted demand for electricity. The aggregation controller sends additional commands to the individual controllers to maintain the wide area aggregated limited resource demand target. The process of bi-directional data transfer and commands continues unabatedly based on the communication of the computerized temperature controllers with the aggregation controller, thus giving priority of use of electricity to the consumer's zones with the greatest demonstrated need.

The user can configure each zone with its own setpoint and a never exceed zone maximum delta temperature. The user can configure a building such that the computerized temperature controller would stand alone, controlling its own zones, mechanical equipment and resource demand without being connected to an aggregation controller. The stand alone method for zone temperature-based demand reduction is implemented either by the consumer's choice or automatically if the communication link between the aggregation controller and the computerized temperature controller is lost.

If communication between the aggregation controller and any of the computerized temperature controllers is lost, the computerized temperature controller will, after a short period of time, convert into the stand alone mode. A communication timer measures the period of time. The communication timer is set at a period of less than the time period in which an electric provider measures a demand. If the electric provider measures the demand, for billing purposes, at fifteen minutes then the timer may be set at seven minutes. After the period of time, the computerized temperature controller limits demand below a current month historical peak. The control of the equipment relies on a maximum demand level allowed, a current level of demand, an operator's setting of the allowed demand level DLx (DLx represents a percentage of the demand limit, such as 80%), the zone maximum delta temperature for each zone, the temperature setpoint in each zone, and a measured temperature.

Figure 6:
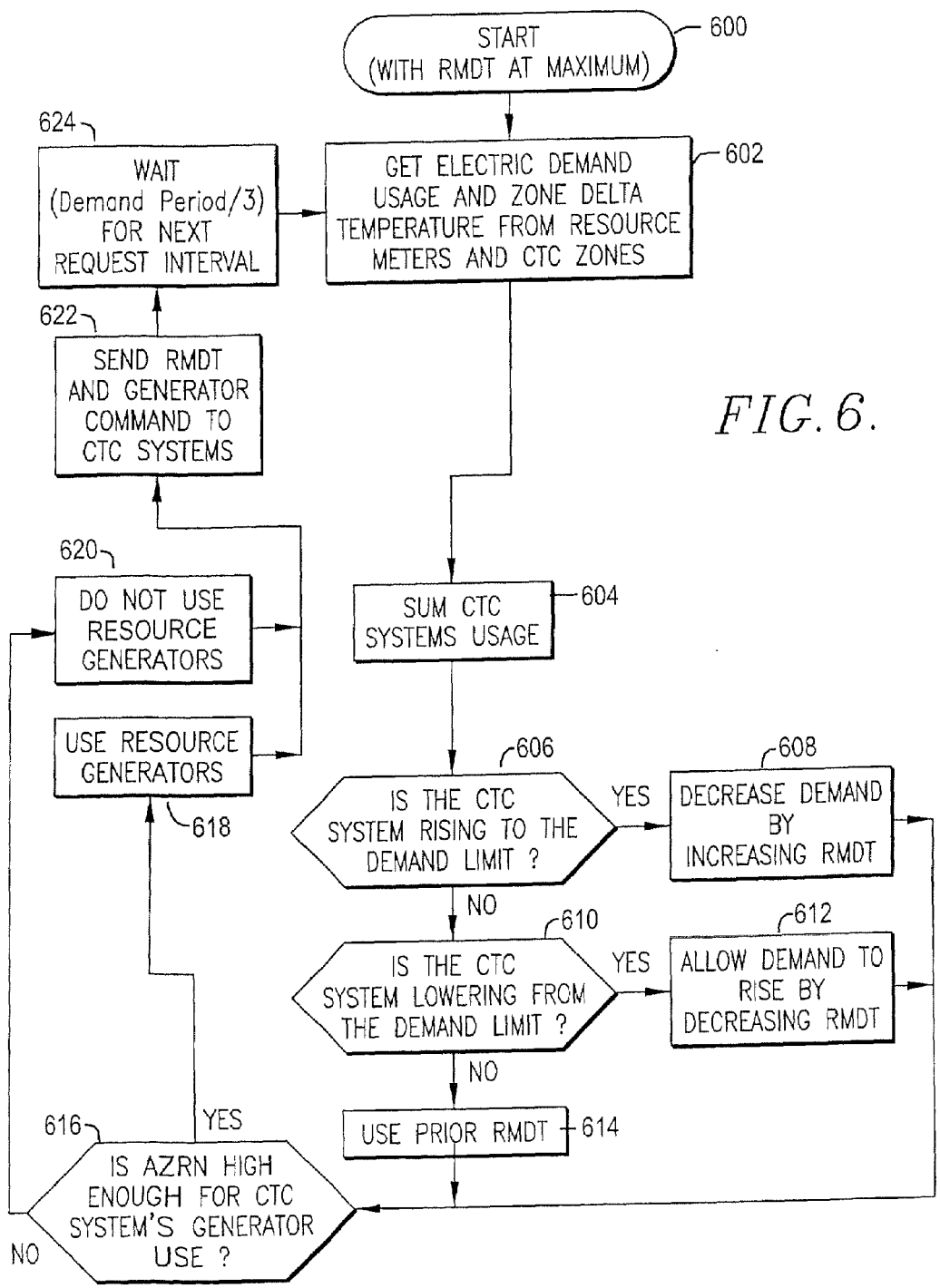
FIG. 6 is a flow diagram generally depicting the steps performed by the computerized temperature controller in adjusting the resource controller maximum delta temperature in a stand alone resource control mode.

FIG. 6 depicts a Stand Alone Resource Control Flowchart. Step 600 sets a resource controller maximum delta temperature (RMDT) to a maximum. In the stand alone mode, the resource controller maximum delta temperature performs similarly to the aggregation maximum delta temperature in the non-stand alone mode previously discussed. Each individual computerized temperature controller maintains the resource controller maximum delta temperature and uses the resource controller maximum delta temperature when the computerized temperature controller is in the stand alone mode. Step 602 retrieves the electric demand usage for the consumer's facility and the zone delta temperatures (difference between the actual temperature and the setpoint at each zone). Step 604 sums the electric demand data for the consumer's facility. Step 606 compares the summation result with an allowed maximum demand limit for the consumer's facility. If the rate of increase meets a specified rate, then step 608 decreases the demand in order not to achieve a total summed demand for the consumer's facility at an undesirable level. Increasing the resource controller maximum delta temperature achieves the decrease in demand in an HVAC application. By increasing the resource controller maximum delta temperature, the HVAC equipment is limited in a methodical procedure so that computerized temperature controller sees a reduction in the demand for the electricity.

Step 610 checks to see the summation result is lowering from the demand limit. If the summation result is lowering from the demand limit, then step 612 allows the consumer's demand to increase by decreasing the resource controller maximum delta temperature.

If the summation result is not rising to the demand limit and the summation result is not lowering from the demand limit, step 614 uses the resource controller maximum delta temperature used in the last loop of calculation.

Step 616 checks the average zone resource need (AZRN) value. The average zone resource need is the average of all the zones' resource need. In this embodiment, the average zone resource need is the average of the delta temperatures from the consumer's zones. The delta temperatures may be weighted from zone to zone depending on the size of the zone. If the average zone resource need is sufficiently high, such that the consumer requires additional generation capacity, step 618 instructs the consumer's generators to start. If the average zone resource need does not justify the start up of the consumer's generators, then step 620 transfers control to step 622 which sends the resource controller maximum delta temperature and the generator command to the appropriate computerized temperature controller zones.

Step 624 waits for a period of time not greater than one-third of a time period over which the electricity provider measures demand before requesting a next sample of the demand data. At the end of the period of time, step 602 repeats the algorithm.

Figure 7:
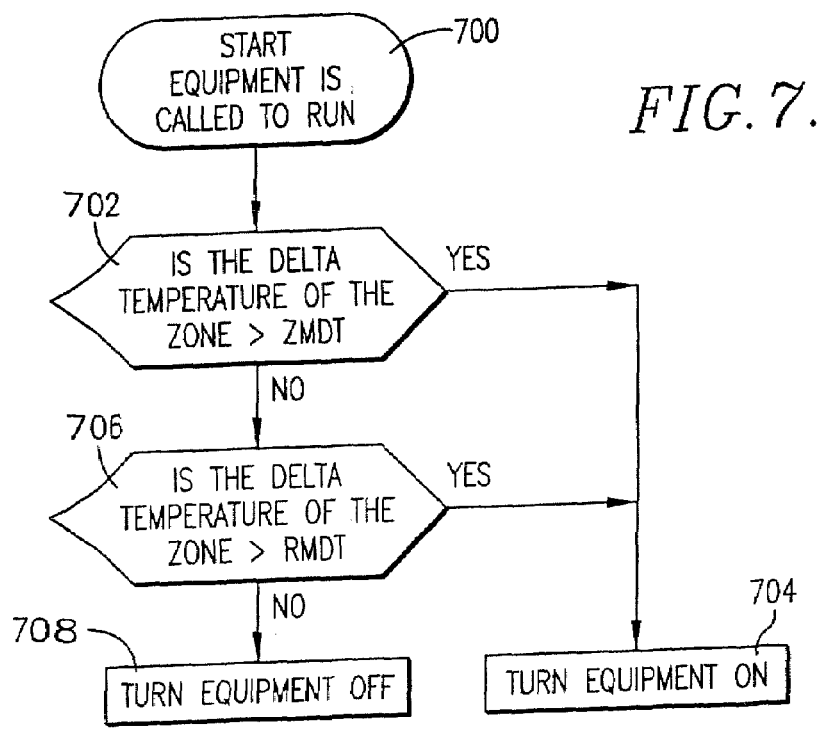
FIG. 7 is a flow diagram generally depicting the steps performed by the computerized temperature controller in performing zone demand reduction in stand alone resource control mode.

Zone demand reduction may be performed in a stand alone mode using the resource controller maximum delta temperature in a similar manner to the method depicted in FIG. 5. FIG. 7 depicts Zone Demand Reduction with RMDT from CTC. Step 700 denotes the initialization of the response algorithm. Step 702 checks if the difference between the actual temperature and the setpoint (delta temperature) is greater than the zone maximum delta temperature. If it is, step 704 allows the equipment to run. If the delta temperature is less than the zone maximum delta temperature, but greater than the resource controller maximum delta temperature, step 706 also allows the equipment to run. If the delta temperature is less than the zone maximum delta temperature and less than the resource controller maximum delta temperature, then step 708 shuts down the equipment in a predetermined manner. As with the non-stand alone embodiment, the procedure allows for control within the zone level of the system, as the user who wishes to increase comfort has only to set their zone maximum delta temperature at a low setting.

Within a wide area aggregation group, consumers' needs vary from consumer to consumer and even from building to building. Some consumers require energy savings and implement high zone maximum delta temperatures in order to save on energy costs. Other consumers implement a low zone maximum delta temperature in order to increase comfort. The following billing formula is used in order to provide fair billing of demand and consumption for the aggregated consumers:

$$\text{Consumer 1 Demand Bill} = (kWA1/(\Sigma kWAN))*kW\$ + \\ (((MZDTAVG1/MZDTAVGA)*kWA1/\Sigma(MZD\text{-}TAVGN/MZDTAVGA)*kWAN)*P\$$$

$$\text{Consumer 1 Consumption Bill} = (kWHA1/\Sigma kWHAN))*kWH\$$$

Where:

kWA1 is demand usage of consumer 1, a consumer in the aggregation group, at the group billing period peak.

kWAN is demand usage of consumer N in the aggregation group, at the group's billing period peak.

kW$ is the cost of the pre-purchased demand capacity for the aggregation group.

kWHA1 is consumption usage of consumer 1, a consumer in the aggregation group, over the group billing period.

kWHAN is consumption usage of consumer N in the aggregation group, over the group's billing period.

kWH$ is the electrical consumption rate for the aggregation group.

AZ is the area in square feet for a zone (z).

ACTCN is the area in square feet for the CTC system.

MZDTAVGN is the average Maximum Zone Delta Temperature per CTC system at the group's billing period peak. MZDT is weighted so that larger the zone in CTC system, the greater the weight and affect the zone has on the average.

P$ is the Penalty cost for the aggregation group using over the aggregation group's pre-purchased demand capacity.

The CTC generates the MZDTAVGN using the following formula and sends the MZDTAVGN to the aggregation controller.

$$MZDTAVGN = \Sigma(MZDTZAVGN/ACTCN)$$

If the aggregation group as a whole does not go over the pre-purchased demand capacity, the demand bill is computed by (kWA1/ΣkWAN))*kW$. If the aggregation group as a whole goes over the pre-purchased demand capacity, those consumers who exceed the aggregation's group average MZDT will receive the greater portion of the cost penalty computed by (((MZDTAVG1/MZDTAVGA)* kWA1)/Σ(MZDTAVGN/MZDTAVGA)*kWAN)*P$.

Aggregation Group Member Requirements

1. Loads must be manageable with CTC system.
2. If recruiting member's peak occurs at group peak, then a minimum of 30% of the connected load must be controlled by the CTC system.
3. If the recruiting member's peak occurs off the group peak, then a minimum of 15% of the connected load must be controlled by the CTC system.

A group member will be able to look at the aggregation data in real time from a web server, which has access to the Aggregation Controller's Aggregation Database. This will allow for the group member to tailor his CTC system settings for the desired energy savings.

Attached hereto as Appendix I is a copy of a wide area aggregation data transfer format. The wide area aggregation data transfer format indicates preferred data transfers between the aggregation controller and the consumer resource controller. When the resource is electricity, the consumer resource controller is referred to as the computerized temperature controller.

Although the invention has been described with reference to the preferred embodiment illustrated in the attached drawing figures, it is noted that equivalents may be employed and substitutions made herein without departing from the scope of the invention as recited in the claims. For example, although the communication link between the aggregation controller and the computerized temperature controllers is described herein as the Internet or the Wide Area Network (WAN) or the combination of the WAN and the Internet, the communication link may be a wireless link without departing from the scope of the invention.

APPENDIX

An appendix entitled "WAA Data Transfer Format" and containing data transfer formats used in the present invention is attached.

WAA Data Transfer Format

General Data Transfer Format

To CRC from AC
CRC ID, AC ID, Request/Reply Code, AC Address, Data (optional), Data (optional), . . . , Time Stamp
To AC from CRC
AC ID, CRC ID, Request/Reply Code, Data (optional), Data (optional), . . . , Time Stamp
To ACb from ACa
ACb ID, ACa ID, Request/Reply Code, ACa Address, Data (optional), Data (optional), . . . , Time Stamp
This data format is incased in the packet format of the network. An example would be the WAA Data Format inside a TCP/IP packet or IPX packet.
Resource Usage Request: 0000H To CRC from AC
CRC ID, AC ID, 0000H, AC Address, Time Stamp
To AC from CRC
AC ID, CRC ID, 0000H, Resource Usage, Time Stamp
Resource Usage and Resource Generator Output Request: 0001H To CRC from AC
CRC ID, AC ID, 0001H, AC Address, Time Stamp
To AC from CRC
AC ID, CRC ID, 0001H, Resource Usage, Generator Output, Time Stamp
Resource Usage and Average Need Request: 0002H To CRC from AC
CRC ID, AC ID, 0002H, AC Address, Time Stamp
To AC from CRC
AC ID, CRC ID, 0002H, Resource Usage, Average Need, Time Stamp
Resource Usage, Generator Output and Average Need Request: 0003H To CRC from AC
CRC ID, AC ID, 0003H, AC Address, Time Stamp
To AC from CRC
AC ID, CRC ID, 0003H, Resource Usage, Generator Output, Average Need, Time Stamp
Resource Generator Capacity Request: 0004H To CRC from AC
CRC ID, AC ID, 0004H, AC Address, Time Stamp
To AC from CRC
AC ID, CRC ID, 0004H, Resource Usage, Generator Capacity, Time Stamp APPENDIX-continued An appendix entitled "WAA Data Transfer Format" and containing
data transfer formats used in the present invention is attached.
WAA Data Transfer Format Resource History Request: 0005H To CRC from AC
CRC ID, AC ID, 0005H, AC Address, From Time Stamp, To Time Stamp, Time Stamp
To AC from CRC
AC ID, CRC ID, 0005H, Number of Records,
   Time Stamp, Resource Usage,
   Time Stamp, Resource Usage,
   . . . ,
Time Stamp
ACa to ACb request data transfer of CRC(s) ID and Address in a Group: 0100H ACb ID, ACa ID, 0100H, ACa Address, Group Mask, Time Stamp
ACa to ACb data transfer of CRC(s) ID and Address in a Group: 0100H ACb ID, ACa ID, 0100H, ACa Address, Number of CRC(s),
   CRC ID, CRC Address, # of Desc1 Bytes, Desc1, # of Desc2 Bytes, Desc2
   CRC ID, CRC Address, # of Desc1 Bytes, Desc1, # of Desc2 Bytes, Desc2
   . . . ,
Group Mask, Time Stamp
ACa to ACb data transfer of CRC(s) ID and Address Received: 0101H ACb ID, ACa ID, 0101H, ACa Address, Number of CRC(s), Time Stamp
ACa to ACb Request for data transfer of CRC(s) Aggregation Data: 0102H ACb ID, ACa ID, 0102H, ACa Address, Number of CRC(s),
   CRC ID, CRC Address, Start Time Stamp, Stop Time Stamp,
   CRC ID, CRC Address, Start Time Stamp, Stop Time Stamp,
   . . . ,
Time Stamp
ACa to ACb data transfer of CRC(s) Aggregation Data: 0103H ACb ID, ACa ID, 0103H, ACa Address, Number of CRC(s),
   CRC ID, CRC Address, Number of Records,
     Time Stamp, Resource Usage,
     Time Stamp, Resource Usage,
     . . . ,
   CRC ID, CRC Address, Number of Records,
     Time Stamp, Resource Usage,
     Time Stamp, Resource Usage,
     . . . ,
   . . . ,
Time Stamp
ACa to ACb data transfer of CRC(s) Aggregation Data Received: 0104H ACb ID, ACa ID, 0104H, ACa Address, Number of CRC(s), Time Stamp
ACa to ACb pass of control of CRC(s) To AC: 0105H ACb ID, ACa ID, 0105H, ACa Address, Number of CRC(s),
   CRC ID, CRC Address,
   CRC ID, CRC Address,
   . . . ,
Time Stamp
ACa to ACb control of CRC(s) To AC passed: 0106H ACb ID, ACa ID, 0106H, ACa Address, Number of CRC(s),
   CRC ID, CRC Address,
   CRC ID, CRC Address,
   . . . ,
Time Stamp
ACa to ACb get control of CRC(s) From AC: 0107H ACb ID, ACa ID, 0107H, ACa Address, Number of CRC(s),
   CRC ID, CRC Address,
   CRC ID, CRC Address,
   . . . ,
Time Stamp
ACa to ACb control of CRC(s) From AC given: 0108H ACb ID, ACa ID, 0108H, ACa Address, Number of CRC(s),
   CRC ID, CRC Address,
   CRC ID, CRC Address,
   . . . ,
Time Stamp

APPENDIX-continued

An appendix entitled "WAA Data Transfer Format" and containing
data transfer formats used in the present invention is attached.
WAA Data Transfer Format ACa to ACb pass control of Aggregation Group To AC: 0109H ACb ID, ACa ID, 0109H, ACa Address, Group Mask, Number of CRC(s),
  CRC ID, CRC Address,
  CRC ID, CRC Address,
  . . . ,
Time Stamp
ACb to ACa control of Aggregation Group To AC passed: 010AH ACb ID, ACa ID, 010AH, ACa Address, Group Mask, Number of CRC(s), Time Stamp
ACb to ACa get control of Aggregation Group From AC: 010BH ACb ID, ACa ID, 010BH, ACa Address, Group Mask, Number of CRC(s),
  CRC ID, CRC Address
  CRC ID, CRC Address
  . . . ,
Time Stamp
ACa to ACb control of Aggregation Group From AC given: 010CH ACb ID, ACa ID, 010CH, ACa Address, Group Mask, Number of CRC(s), Time Stamp
CRC Join Aggregation Group R qu st: 010DH To CRC from AC
AC ID, CRC ID, 010DH, CRC Address, Group Mask, Time Stamp
To CRC from AC
CRC ID, AC ID, 010DH, Group Mask, Time Stamp
Resource Need Command: 0200H To CRC from AC
CRC ID, AC ID, 0200H, AC Address, Resource Need, Time Stamp
To AC from CRC AC ID, CRC ID, 0200H, Resource Need, Time Stamp
Resource Need and Generator Command: 0201H To CRC from AC
CRC ID, AC ID, 0201H, AC Address, Resource Need, Time Stamp
To AC from CRC
AC ID, CRC ID, 0201H, Resource Need, Time Stamp
Resource Generator Command: 0202H To CRC from AC
CRC ID, AC ID, 0202H, AC Address, Requested Generator Output, Time Stamp
To AC from CRC
AC ID, CRC ID, 0202H, Output of Generator, Time Stamp Data Types
AC ID: IPv6 format address, 128 bits, unique to all WAA ACs and CRCs
CRC ID: IPv6 format address, 128 bits, unique to all WAA ACs and CRCs
Aggregation Group Mask: IPv6 format address mask
Request and Reply Codes, 32 bits
AC Address: Network Address, Example IPv4 or IPv6, network dependant
Time Stamp: 56 bits, Hour Minute Second Month Day Century Year
Resource Usage: 64 bits
Generator Output 64 bits
Generator Capacity 64 bits
Resource Need: 64 bits

Having thus described the preferred embodiment of the invention, what is claimed as new and desired to be protected by Letters Patent includes the following:

1. A computer-implemented method of providing a limited consumable energy resource to a plurality of individual users located at geographically discrete user locations, the method comprising the steps of:

aggregating the plurality of individual users at said geographically discrete locations into an energy resource-consuming block;

arranging for the availability of the resource from at least one supplier of the resource, said resource being a consumable energy resource; and using a computer system to regulate real-time use of an amount of the resource by each of the individual users based on each of the user's need for the resource at the user's discrete location so that a particular user having a greater need for the resource receives a greater provision of the resource while controlling usage of the resource by said block to maintain aggregated usage of the resource below a predetermined level, said regulating step comprising the steps of obtaining energy demand and need information from at least some of said users, and using said demand and need information in said system in order to:

(a) allocate respective amounts of the resource to the individual users;

(b) vary over time the allocated amounts of the resource to the individual users; and (c) control the usage of the resource by the individual users as necessary to maintain the aggregate usage of the resource by all of the users below said predetermined level.

2. The method as set forth in claim 1, wherein the plurality of users are attached to a plurality of distribution systems owned by a plurality of distributors of the resource.

3. The method as set forth in claim 1, wherein the plurality of users are served by a plurality of separately owned resource generators.

4. The method as set forth in claim 1, wherein the plurality of users are attached to a distribution system owned by one supplier of the resource.

5. The method as set forth in claim 1, wherein the plurality of users combine their resource requirements and purchase the resource as an aggregation of consumers.

6. The method as set forth in claim 5, wherein the plurality of users are located over a geographical area of a plurality of sizes.

7. The method as set forth in claim 1, wherein the resource is a resource selected from the group consisting of electricity, natural gas, propane, chilled water, steam, oil, coal, hot water, and other products delivered by a defined distribution system.

8. A computer-implemented method of providing a limited consumable energy resource to a plurality of individual users located at geographically discrete user locations, the method comprising the steps of:

aggregating the plurality of individual users at said geographically discrete locations into an energy resource-consuming block;

arranging for the availability of the resource from at least one supplier of the resource, said resource being a consumable energy resource; and using a computer system to regulate real-time use of an amount of the resource by each of the individual users based on each of the user's need for the resource at the user's discrete location so that a particular user having a greater need for the resource receives a greater provision of the resource while controlling usage of the resource by said block to maintain aggregated usage of the resource below a predetermined level wherein regulating the real time use of the amount of the resource by each of the users includes the steps of:

monitoring all of the users' demand for the resource;

aggregating the users' demand for the resource;

comparing the aggregated demand for the resource to a demand limit;

if the aggregated demand for the resource is rising to the demand limit, increasing a first variable representing an allowed maximum difference in a measurement of need for the resource between a setpoint and the current condition; and if the aggregated demand for the resource is lowering from the demand limit, decreasing the first variable.

9. The method as in claim 8, wherein regulating the real time use of the amount of the resource by each of the users further includes the steps of:

maintaining a second variable representing an allowed maximum difference in a measurement between the setpoint and current condition per a user's zone or associated equipment;

comparing the second variable to a third variable representing a difference between the setpoint and current condition of the zone or associated equipment, if the third variable is greater than the second variable, then associated equipment is allowed to operate; and comparing the first variable to the third variable, if the third variable is greater than the first variable, then the associated equipment is allowed to operate.

10. The method as in claim 9, wherein the measurement of the need for the resource is a measurement of temperature.

11. The method as in claim 10, wherein regulating the real time use of the amount of the resource by each of the users further includes the step of: if a user has a weighted average of the second variable that is higher than the weighted average of the second variable of the other users when the aggregated demand exceeds the demand limit, charging the user a penalty proportional to the amount the weighted average of the second variable of the user is higher than the weighted average of the second variable for the other users.

12. The method of claim 1, said regulating step comprising the steps of:

aggregating the total use of the resource from all of said individual users; and comparing said aggregated total use of the resource with said predetermined level, and, in response to such comparison, regulating the permitted usage of the resource from said at least one supplier by at least certain of said individual users, in order to ensure that said aggregated total use does not exceed said level.

13. The method of claim 1, said block being a purchasing block.

14. The method of claim 1, each of said user locations having a plurality of energy-consuming locations, said regulating step further comprising monitoring the energy-consuming locations of each user to determine each energy-consuming location's need for the resource, and controlling the permitted use of the resource for each user by allocating the resource to the plural energy-consuming locations so that an energy-consuming location with a greater need for the resource as compared with another of the user's energy-consuming locations receives greater provision of the resource than said other energy-consuming locations.

15. A computer-implemented method of limiting aggregate use of a consumable energy resource by a plurality of energy-consuming locations, said method comprising the steps of:

aggregating the locations into an energy resource-consuming block, each of said locations having an initial setpoint related to energy need at the location and a maximum allowable variance from the initial setpoint;

arranging for the availability of said consumable energy resource; and using a computer system to regulate real-time use of the resource at said locations based upon the need at each location for the resource in order to affect the energy consumption as desired at the locations, so that a particular location having a greater need for the resource receives a greater provision of the resource while controlling usage of the resource by said block to maintain aggregated usage of the resource below a predetermined limit, said regulating step comprising the steps of:

monitoring the aggregated level of use of the resource from all of the locations; and comparing the aggregated level of use of the resource with said predetermined limit, and, in response to such comparison, controlling the permitted use of the resource by at least certain of said locations, in order to insure that the aggregated level of use of the resource does not exceed said predetermined limit, said controlling step comprising the steps of increasing or decreasing the maximum allowable variances of the locations as necessary.

16. The method of claim 15, said location condition being location temperature and said initial setpoint for each location being a setpoint temperature for the location.

17. The method of claim 16, said setpoint temperature being different in at least certain of said locations.

18. The method of claim 16, said initial maximum allowable variance being a temperature variance.

19. The method of claim 16, said initial maximum allowable variance being the same for all of said locations.

20. The method of claim 15, including the step of also monitoring the actual variance in each location from the setpoint for that location.

21. The method of claim 15, including the step of repeating said regulating step at intervals over time to generate respective control cycle loops.

22. The method of claim 21, including the step of using the increased or decreased maximum allowable variances obtained during a control cycle loop as the assigned initial maximum allowable variances for the next succeeding control cycle loop.

23. The method of claim 15, said energy resource being a resource selected from the group consisting of electricity, natural gas, propane, chilled water, steam, oil, coal, hot water, and other products delivered by a defined distribution system.

24. The method of claim 15, wherein said block is a purchasing block for the resource.

25. The method of claim 15, said locations being temperature control zones.

26. The method of claim 25, said zones being located in a single facility.

27. The method of claim 26, said temperature control zones being separate rooms in said facility.

28. The method of claim 15, said zones each associated with a computerized temperature controller.

29. The method of claim 15, said locations each having an individual location maximum allowable variance setpoint, wherein each respective location ceases being regulated by the maximum allowable variance of the respective location if the variance of the respective location is greater than the location maximum allowable variance setpoint.

30. The method of claim 29, said location maximum allowable variance setpoint being a temperature variance setpoint.

31. The method of claim 30, including the step of calculating an average of such actual variances.

* * * * *

UNITED STATES PATENT AND TRADEMARK OFFICE
CERTIFICATE OF CORRECTION

| | | |
|---|---|---|
| PATENT NO. | : 7,249,043 B1 | Page 1 of 1 |
| APPLICATION NO. | : 09/522751 | |
| DATED | : July 24, 2007 | |
| INVENTOR(S) | : Trout, II et al. | |

It is certified that error appears in the above-identified patent and that said Letters Patent is hereby corrected as shown below:

The equation beginning at column 10, line 38, should be replaced with the following equation:

Consumer 1 Demand Bill= (kWA1/(ΣkWAN))*kW$+(((MZDTAVGA/MZDTAVG1) *kWA1/Σ(MZDTAVGA/MZDTAVGN)*kWAN)*P$ The paragraph beginning at column 11, line 8, should be replaced in its entirety with the following paragraph:

If the aggregation group as a whole does not go over the pre-purchased demand capacity, the demand bill is computed by (kWA1/ΣkWAN))*kW$. If the aggregation group as a whole goes over the pre-purchased demand capacity, those consumers who are below the aggregation's group average MZDT will receive the greater portion of the cost penalty computed by ((MZDTAVGA/MZDTAVG1) *kWA1/Σ(MZDTAVGA/ MZDTAVGN)*kWAN)*P$.

Signed and Sealed this

Sixth Day of November, 2007

JON W. DUDAS
*Director of the United States Patent and Trademark Office*